United States Patent
Klein et al.

(10) Patent No.: US 11,981,438 B2
(45) Date of Patent: *May 14, 2024

(54) RETENTION OF FLIGHT DECK PREFERENCES

(71) Applicant: Rockwell Collins, Inc., Cedar Rapids, IA (US)

(72) Inventors: Clifford R. Klein, Marion, IA (US); Jason J. Valestin, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 406 days.

This patent is subject to a terminal disclaimer.

(21) Appl. No.: 16/584,189

(22) Filed: Sep. 26, 2019

(65) Prior Publication Data

US 2021/0394908 A1    Dec. 23, 2021

(51) Int. Cl.
*B64D 11/06*      (2006.01)
*B64D 11/00*      (2006.01)
*B64D 43/00*      (2006.01)

(52) U.S. Cl.
CPC .... *B64D 11/06395* (2014.12); *B64D 11/0691* (2014.12); *B64D 43/00* (2013.01); *B64D 2011/0038* (2013.01)

(58) Field of Classification Search
CPC .......... B64D 11/06395; B64D 11/0691; B64D 43/00; B64D 2011/0038
See application file for complete search history.

(56) References Cited

U.S. PATENT DOCUMENTS

| | | | | |
|---|---|---|---|---|
| 5,056,742 A | * | 10/1991 | Sakurai | B64C 25/42 74/478 |
| 5,158,459 A | * | 10/1992 | Edelberg | G09B 9/28 434/45 |
| 6,250,589 B1 | * | 6/2001 | Russ | G05G 5/28 70/203 |
| 7,131,389 B1 | * | 11/2006 | Hawkes | B63G 8/18 114/330 |

(Continued)

FOREIGN PATENT DOCUMENTS

| | | | | |
|---|---|---|---|---|
| CN | 101784439 A | | 7/2010 | |
| FR | 2918642 A1 | * | 1/2009 | ......... B64D 11/0015 |

(Continued)

*Primary Examiner* — Donald J Wallace
*Assistant Examiner* — Jalal C Coduroglu
(74) *Attorney, Agent, or Firm* — Suiter Swantz IP (57) ABSTRACT

A system and method for retention of flight deck preferences operates to control a comprehensive combination of aircraft systems and system configurations enabling a pilot to seamlessly retain and recall the desired preferences based on a plurality of mission related factors. With system control of flight deck physical settings including seat position and shape, display illumination and color and internal and external lighting configurations, the system allows a pilot to save time, effort, and minimize errors of system set up and configuration. With a short entry, or short-range sensing, of the pilot ID, the pilot commands the system and method for retention of flight deck preferences to configure each of the plurality of aircraft systems according to the recalled pilot preference.

15 Claims, 6 Drawing Sheets

(56) References Cited

U.S. PATENT DOCUMENTS

| | | | |
|---|---|---|---|
| 9,032,319 B1* | 5/2015 | Hammack | G08G 5/0039 715/769 |
| 9,428,088 B1* | 8/2016 | Rajasingham | B60N 2/68 |
| 9,523,985 B1* | 12/2016 | Barnes | B64D 43/00 |
| 9,530,318 B1* | 12/2016 | Turner | G08G 5/0034 |
| 9,619,919 B1* | 4/2017 | Postnikov | H04N 13/398 |
| 9,703,476 B1* | 7/2017 | Pappas | G06F 3/04847 |
| 9,758,116 B2 | 9/2017 | Xiong et al. | |
| 9,821,910 B1* | 11/2017 | Suiter | B64D 45/0059 |
| 10,279,890 B2 | 5/2019 | De Bossoreille et al. | |
| 2004/0260470 A1* | 12/2004 | Rast | G06Q 10/0637 705/337 |
| 2010/0222993 A1* | 9/2010 | Brainard | G01D 7/02 701/124 |
| 2010/0282902 A1* | 11/2010 | Rajasingham | B60N 2/012 297/284.3 |
| 2013/0166135 A1* | 6/2013 | Dunsdon | G07C 5/0808 701/29.3 |
| 2014/0074325 A1* | 3/2014 | Nikolic | G01C 23/00 701/14 |
| 2016/0124428 A1* | 5/2016 | Nutaro | B64D 13/06 701/2 |
| 2016/0179327 A1* | 6/2016 | Zammit-Mangion | G06F 3/0482 701/3 |
| 2016/0225263 A1* | 8/2016 | Salentiny | G08G 5/0039 |
| 2017/0267330 A1 | 9/2017 | Hreha et al. | |
| 2017/0277185 A1* | 9/2017 | Duda | B64C 13/18 |
| 2018/0034834 A1* | 2/2018 | Mitchell | H04L 63/1416 |
| 2018/0232097 A1* | 8/2018 | Kneuper | G06F 3/0416 |
| 2020/0027361 A1* | 1/2020 | Rutkiewicz | G06T 7/579 |

FOREIGN PATENT DOCUMENTS

| | | | |
|---|---|---|---|
| FR | 3049574 A1 | 10/2017 | |
| WO | WO-2014008201 A1 * | 1/2014 | B60Q 1/44 |
| WO | WO-2017149526 A2 * | 9/2017 | G01B 11/026 |
| WO | WO-2018104929 A1 * | 6/2018 | G05B 19/042 |

* cited by examiner

RETENTION OF FLIGHT DECK PREFERENCES

BACKGROUND

Typically, there are many different pilots that will fly the same aircraft. Each time a new pilot enters a flight deck the new pilot may require a reconfiguration of one or more aircraft systems to match the new pilot's personal preferences. Further, different missions may require differing settings appropriate to the pilot preference during the specific mission.

Some flight decks may attempt to help by saving the most recently used settings on power down. During the next power up, the saved settings may appear an must be changed should the new pilot be assigned the aircraft.

Other flight decks may house pilot preferences on a data card which may save a limited amount of data to properly configure the aircraft. With little integration, the number of settings typically recalled by these systems may be limited to a single function due to a lack of flight deck system integration.

Therefore, a need remains for a system and related method which may overcome these limitations and provide a novel solution to retention of specific and comprehensive pilot preferences for each aircraft system for each aircraft flown by each pilot.

SUMMARY

In one aspect, embodiments of the inventive concepts disclosed herein are directed to a system for retention of flight deck preferences. The system may comprise a pilot interface within a flight deck of an aircraft and a Data Concentrating Unit (DCU) onboard the aircraft, the DCU configured for receiving a digital input and sending a control signal to an aircraft system in compliance with the digital input. For control of the system, a controller may be operatively coupled with the DCU to control a plurality of aircraft systems, each having an aircraft system configuration.

To retain each flight deck preference, a tangible, non-transitory memory may be configured to communicate with the controller, the tangible, non-transitory memory having instructions stored therein that, in response to execution by the controller, cause the controller to carry out one or more tasks of the system for retention of flight deck preferences.

The system tasks may enable the controller to receive a pilot identification (ID) from the pilot interface, the pilot ID associated with a pilot and save the pilot ID to the memory. The system may receive a recall command from the pilot, the recall command including a pilot preference associated with the aircraft system configuration and the pilot ID and retrieve the aircraft system configuration associated with the pilot preference from the memory based on the recall command.

Based on the pilot preference and pilot ID, the system may command the aircraft system configuration of each of the plurality of aircraft systems, via the DCU, to comply with the pilot preference based on the retrieved aircraft system configuration associated with the pilot preference. Here, the aircraft system configuration applies to each of the plurality of aircraft systems including each of an aircraft flight deck seat position, an aircraft flight deck seat shape, an aircraft flight deck rudder pedal position, an aircraft flight deck interior lighting illumination level, an aircraft flight deck interior lighting color, an aircraft flight deck display windows configuration, an aircraft flight deck display illumination level, an aircraft flight deck display symbology, an aircraft exterior light illumination level, an aircraft exterior strobe light frequency, and an aircraft exterior strobe light color.

A further embodiment of the inventive concepts disclosed herein may include a method for retention of flight deck preferences. The method may comprise receiving a pilot identification (ID), the pilot ID associated with a pilot and saving the pilot ID to an onboard memory. To comply with pilot commands, the method may include receiving a recall command from the pilot, the recall command including a pilot preference associated with an aircraft system configuration and the pilot ID and retrieving the aircraft system configuration associated with the pilot preference from the onboard memory based on the recall command. To configure each system, the method may include commanding the aircraft system configuration of each of a plurality of aircraft systems based on the retrieved aircraft system configuration associated with the pilot preference.

Here, each of the aircraft system configuration applies to each of an aircraft flight deck seat position, an aircraft flight deck rudder pedal position, an aircraft flight deck interior lighting illumination level, an aircraft flight deck interior lighting color, an aircraft flight deck display windows configuration, an aircraft flight deck display illumination level, an aircraft flight deck display symbology, an aircraft exterior light illumination level, an aircraft exterior strobe light frequency, and an aircraft exterior strobe light color.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for retention of flight deck preferences operates to control a comprehensive combination of aircraft systems and system configurations enabling a pilot to seamlessly retain and recall the desired preferences based on a plurality of mission related factors. With system control of flight deck physical settings including seat position and shape, display illumination and color and internal and external lighting configurations, the system allows a pilot to save time, effort, and minimize errors of system set up and configuration. With a short entry, or short-range sensing, of the pilot ID, the pilot commands the system and method for retention of flight deck preferences to configure each of the plurality of aircraft systems according to the recalled pilot preference

| REFERENCE | CHART |
|---|---|
| 100 | System Diagram |
| 110 | Controller |
| 112 | Pilot Interface |
| 114 | Memory |
| 116 | Digital Control Unit (DCU) |
| 120 | Operations Office |
| 122 | Radio Frequency ID (RFID) |
| 124 | Data Transfer Cartridge (DTC) |
| 126 | Magnetic Card Reader |
| 128 | Multi-Function Display (MFD) |
| 130 | Personal Digital Assistant (PDA) |
| 132 | Biometric Scanner |
| 150 | Aircraft Systems |
| 200 | MFD Overview |
| 230 | Pilot Preference Selection |
| 232 | MFD Pilot Interface |
| 300 | Transport Flight Deck |
| 310 | RFID Reader |
| 312 | Bio Scanner |
| 314 | Magnetic Card Reader |
| 316 | Transport MFD |
| 320 | Vertical |
| 322 | Lateral |
| 324 | Longitudinal |
| 340 | Flight Deck Seat |
| 342 | Seat Back |
| 344 | Seat Lumbar |
| 346 | Seat Armrest |
| 350 | Flight Control Yoke |
| 352 | Rudder Pedals |
| 354 | Brake Pedals |
| 360 | Overhead Lights |
| 362 | Overhead Panel Lighting |
| 364 | Forward Glareshield Panel |
| 366 | Glareshield Lighting |
| 368 | Flight Deck Lights Control |
| 400 | Fighter Cockpit |
| 410 | DTC Loader |
| 416 | Fighter MFD |
| 418 | Head Up Display (HUD) |
| 420 | Flood Lights |
| 440 | Ejection Seat |
| 442 | Ejection Seat Leg Extension |
| 450 | Flight Control Stick |
| 452 | Fighter Rudder Pedals |
| 454 | Fighter Brake Pedals |
| 456 | Throttle |
| 460 | Interior Lights Control |
| 462 | Exterior Lights Control |
| 464 | Warning/Caution Lights |
| 500 | Logic Flow |
| 502 | Receive Pilot ID |
| 504 | Preference Included with ID? |
| 506 | Query Onboard Memory for ID |
| 508 | ID within Memory? |
| 510 | Report no ID |
| 512 | Store New ID |
| 514 | Receive Recall Command |
| 516 | Retrieve System Config. |
| 518 | Command System to Config. |
| 520 | Monitor System Config. |

-continued

| REFERENCE | CHART |
|---|---|
| 522 | Store Pilot Preference |
| 524 | Associate ID, Pref, Config. |
| 526 | Store ID, Pref, Config. in Memory |
| 600 | Method Flow |
| 602 | Receive Pilot ID |
| 604 | Save Pilot ID to Memory |
| 606 | Receive Recall Command |
| 608 | Retrieve Aircraft System Configuration |
| 610 | Command Aircraft System Configuration |

Figure 1:
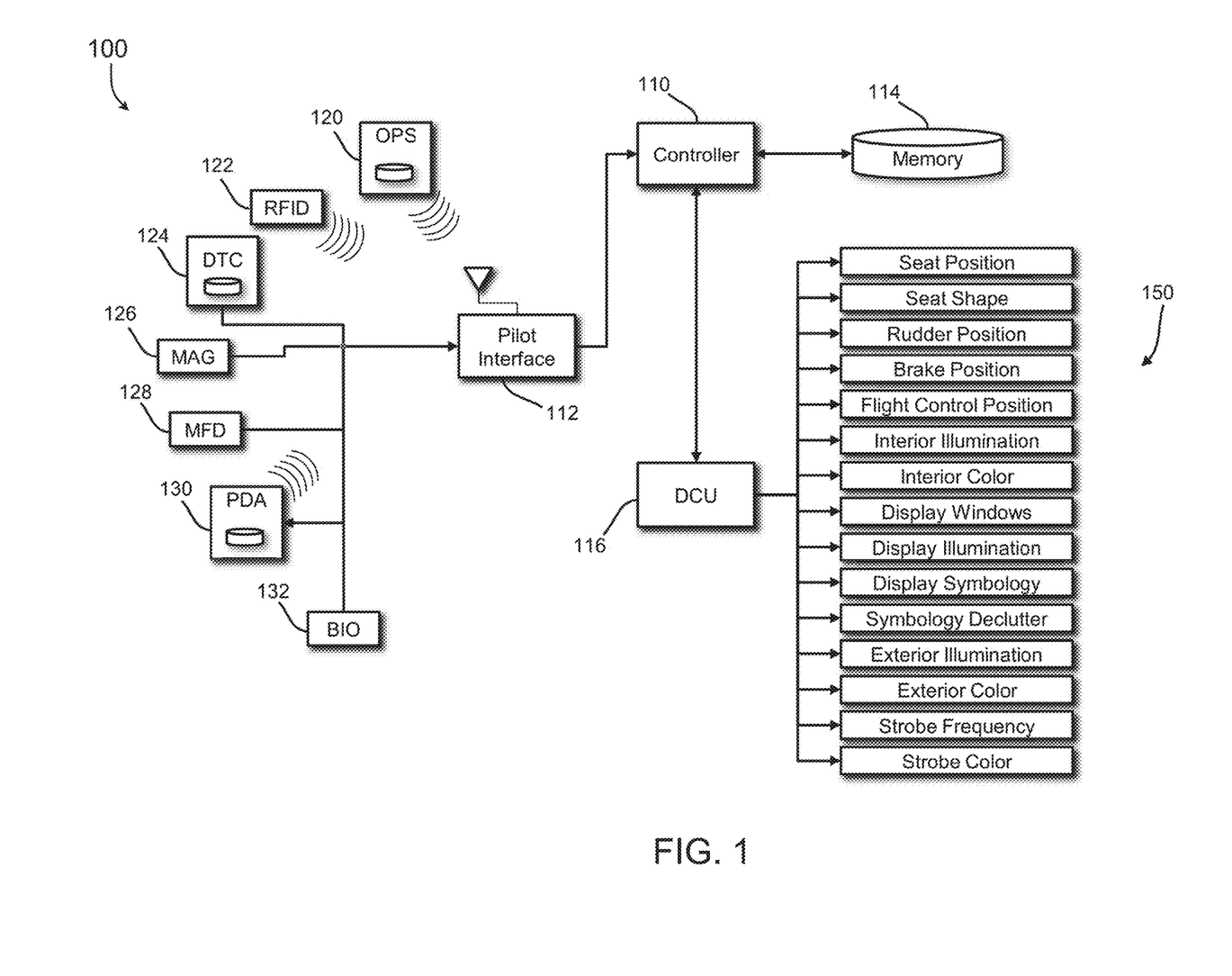
FIG. 1 is a diagram of a system for retention of flight deck preferences in accordance with an embodiment of the inventive concepts disclosed herein.

FIG. 1 System

Referring to FIG. 1, a diagram of a system for retention of flight deck preferences in accordance with an embodiment of the inventive concepts disclosed herein is shown. Generally, a system for retention of flight deck preferences 100 may include a pilot interface 112 within a flight deck of an aircraft and a Data Concentrating Unit 116 (DCU) onboard the aircraft. Here, the DCU may be configured for receiving a digital input and sending a control signal to a plurality of aircraft systems 150 in compliance with the digital input.

The system for retention of flight deck preferences 100 may further include a controller 110 operatively coupled with the DCU 116 to command a configuration of the plurality of aircraft systems 150, each aircraft system having a specific aircraft system configuration. For storage of commands and data, the system for retention of flight deck preferences 100 may include a tangible, non-transitory memory 114 configured to communicate with the controller, the tangible, non-transitory memory having instructions stored therein that, in response to execution by the controller, cause the controller to carry out one or more tasks of the system for retention of flight deck preferences 100.

In one embodiment of the inventive concepts disclosed herein, the system for retention of flight deck preferences 100 may control a comprehensive combination of aircraft systems and system configurations enabling a pilot to seamlessly retain and recall the desired preferences based on a plurality of mission related factors. With a short entry of the pilot ID and preference, the pilot may command the system for retention of flight deck preferences 100 to configure each of the plurality of aircraft systems 150.

Seat

One aircraft system configuration may apply to an aircraft flight deck seat position including a seat vertical position, a seat longitudinal position, a seat lateral position, a seat back recline position, a seat base angle, and an armrest position. One aircraft system configuration may apply to an aircraft flight deck seat shape including a lumbar support vertical position (e.g., height) and a lumbar support size and shape, and a seat pan size including an extension under an upper leg to match a pilot anthropometric measurement of the femur leg length. For pilot safety during ejection and support during maneuvers, a seat pan size to match the length of the femur may increase a pilot ability to sustain gravity (G) tolerance as well as a possibility of pilot leg integrity during initial seat ignition and follow on wind forces.

The aircraft system configuration may also apply to an aircraft flight deck seat armrest position including angular position relative to the seat back, lateral position relative to a center of the seat, and an extended or stowed position. The aircraft system configuration may also apply to an aircraft flight deck seat headrest vertical and longitudinal position. in addition to pilot comfort, the headrest position may protect a head and neck area of the pilot during high G maneuvers as well as during ejection.

Rudder

One aircraft system configuration may apply to an aircraft flight deck rudder pedal position including a longitudinal position of the rudder pedals, a vertical position of the rudder pedals, a position of the brake pedals atop the rudder pedals, and a lateral angle (about a lateral axis of the aircraft) of the rudder pedals. For example, one pilot may have feet sized to reach a toe brake located atop the rudder pedals while another pilot with smaller feet may be unable to reach the toe brakes. Embodiments herein may command the brake position to a position reachable by the pilot with a shorter or longer anthropometric foot measurement.

Flight Controls

One aircraft system configuration may apply to a position of an aircraft flight deck flight control including a vertical position and longitudinal position of the flight controls. Applicable to each of a commercial flight deck (e.g., yoke) and a fighter cockpit (e.g., stick), the flight control position may enable differing sized of pilot to command a flight control position conforming with the pilot size.

Interior Lights

One aircraft system configuration may apply to an aircraft flight deck interior lighting illumination level including a brightness of each light on the flight deck. In embodiments, interior lights may include flood lights, backlights, thunderstorm lights, and glareshield lights. Additionally, the aircraft system configuration may apply to an aircraft flight deck interior lighting color including a normal white, a red, and a color compatible with a Night Vision Imaging System (NVIS). For example, during a night combat mission, one pilot preference may include a NVIS setting selectable by the pilot at a time appropriate to the mission. Some missions may include a NVIS flight deck shortly after takeoff when a pilot may normally don a set of night vision goggles (NVG). In this manner, the system for retention of flight deck preferences 100 may properly configure the flight deck internal illumination level and color to the pilot preference NVIS setting without further pilot action.

Flight Deck Displays

One aircraft system configuration may apply to an aircraft flight deck display windows management configuration including a specific information oriented on a specific display. For example, during a preflight, a pilot may recall a preflight setting including engine indications and systems status display on a prominent (e.g., center) MFD. During a before takeoff checklist the pilot may recall a separate takeoff setting to include an exemplary primary flight display on one MFD and engine indications on an additional MFD.

Another aircraft system configuration may apply to an aircraft flight deck display illumination level including a day illumination level, a night illumination level, and an NVIS setting. Here, the pilot may recall a specific setting based on the mission and ambient external available lighting.

Separate from illumination, the information displayed on each MFD to the pilot may be recalled for specific pilot preference. In embodiments, the symbology displayed to the pilot may configurable on a number of display types including a forward mounted display (e.g., MFD) symbology, a heads up display symbology, and a Helmet Mounted Device (HMD) symbology. One aircraft system configuration may apply to an aircraft flight deck display symbology including a pilot preference for data displayed during a specific portion of a mission. For example, during a VFR takeoff, a primary flight display may be one symbology available to the pilot while during an instrument flight rules (IFR) takeoff, a more detailed primary flight display and a navigation display (e.g., horizontal situation indicator) may provide the desired symbology. Similarly, during low level flight, one pilot preference may include a prominently displayed Light Detection and Ranging (LIDAR) picture of surrounding terrain.

In addition, one pilot preference may include a type of symbology displayed to the pilot. For example, a display cursor preference may include preferences such as cursor symbol shape, cursor slew sensitivity, and cursor orientation (e.g., upright, inverted axis). In this manner, the pilot preference may include each aspect of the display type and interaction capabilities.

Similarly, during a specific phase of flight, the pilot may recall a specific aircraft system configuration to include a windows orientation and display configuration. For example, during cruise a pilot preference may include a system display on one MFD and a fuel display on another MFD. In this manner, the pilot preference may be tailored to the specific pilot and specific phase of flight.

Also, the system for retention of flight deck preferences 100 may allow a pilot to recall a pilot preference enabling a declutter level of the aircraft flight deck display symbology. This option for pilot preference may remove specific symbology from the MFD during certain combat operations. For example, in one environment, a radar picture may include a plurality of information occluding a portion of the display from pilot view. With the option of recalling a pilot preference to declutter the radar display, the pilot may view the entirety of the MFD allowing for greater mission success.

Exterior Lights

One aircraft system configuration may apply to an aircraft exterior light illumination level including an on/off setting of each exterior light and a brightness setting of each. For example, during a day takeoff, a pilot preference may include all exterior lights on a maximum brightness setting while a night takeoff the pilot preference may include a less than full brightness setting. During aerial refueling, the system for retention of flight deck preferences 100 may include one pilot preference of specific internal and external lights at a pilot preferred illumination level.

As some aircraft may be fitted with a variable strobe setting, one aircraft system configuration may apply to an aircraft exterior strobe light frequency. For example, one pilot preference may include a single, double, or triple strobe at a plurality of settings. Here a flight lead may command one setting via recall of a pilot preference and a wingman may command another thereby easing friendly visual recognition during both day and night operations.

Similarly, one aircraft system configuration may apply to an aircraft exterior strobe light color. If fitted with variable external strobe color (e.g., white, green, red, NVG), the system for retention of flight deck preferences 100 may enable the pilot to recall the pilot preference to select and configure the external strobes based on the pilot preference. For example, during day operations, a white setting may be appropriate while during a night combat mission, an infrared NVG setting may be appropriate. Further, during an aerial refueling mission, a pilot of a tanker aircraft may recall a specific setting to configure the external strobes to green to enable receiver aircraft to easily identify the tanker and specific tanker colors to communicate messages to the receiver aircraft.

In addition, a pilot may set a preference for anticipated situations where time may be of the essence. For example, a pilot preference may include an emergency setting where the pilot may recall an aircraft system configuration to configure each exterior light a full brightness, each interior light at full brightness, and a specific strobe color and frequency. In this manner, the pilot may quickly recall the emergency setting to provide a greater level of safety during the emergency situation.

Pilot ID

In one embodiment of the inventive concepts disclosed herein, a pilot identification (ID) may be received from a plurality of sources via the pilot interface 112 including wireless and wired applications. For example, wireless options may include a data link as well as an RF signal from an operations office 120. Here, it is contemplated a data storage offboard the aircraft may maintain the pilot ID as well as a pilot preference for aircraft system configuration. For example, based on time of day and expected mission, the pilot may set up an aircraft system configuration while preflight planning, save the aircraft system configuration to a memory within a preflight planning system, then wirelessly recall the flight deck configuration from the offboard memory to the controller 110 during aircraft preflight.

Another embodiment may include an RF signal from a radio frequency identification (RFID) 122 to provide the pilot ID. Here, a pilot may swipe or proximally excite the RFID to wirelessly send the pilot ID to the controller 110 via the pilot interface 112.

Additionally, a personal digital assistant (PDA) 130 may provide the pilot ID wirelessly as well as via a wired connection. Here also, the PDA 130 may include a memory for storage of a pilot preference for aircraft system configuration. Contemplated herein, the pilot may store an aircraft system configuration within the PDA memory and recall the pilot preference and aircraft system configuration when within RF range of a receiver onboard the aircraft.

In one embodiment of the inventive concepts disclosed herein, the controller may receive the pilot ID and optionally the pilot preference via a wired connection from a data transfer cartridge (DTC) 124 physically loaded into a receptacle onboard the aircraft. Contemplated herein, the DTC 124 may, as above with the PDA 130 and operation office 120 embodiments, maintain a DTC memory loadable by the pilot during preflight planning. Once onboard the aircraft, the pilot may insert the DTC 124 within an onboard receptacle and transfer a plurality of data including the pilot ID, pilot preference, and aircraft system configuration to the controller 110 and memory 114.

In another embodiment, some devices my receive the pilot ID allowing the controller 110 to look up a pilot and recall a pilot preference based on the pilot ID. A magnetic card reader 126 may function to sense or read the pilot ID and transmit the pilot ID to the controller 110 via the pilot interface 112. An input via an MFD 128 may receive the pilot ID and supply the controller 110 the needed information. The magnetic card reader may include an employee number while the MFD 128 may include a keypad for alphanumeric input. A biometric scanner 132 may function to read a biometric attribute of the pilot and supply the controller 110 with the pilot ID. The biometric scanner 132 may include one or more scanners to provide the controller 110 with the pilot ID via recognition of a physical characteristic of the pilot (e.g., fingerprint, face and eye recognition, voice recognition, etc.).

Figure 2:
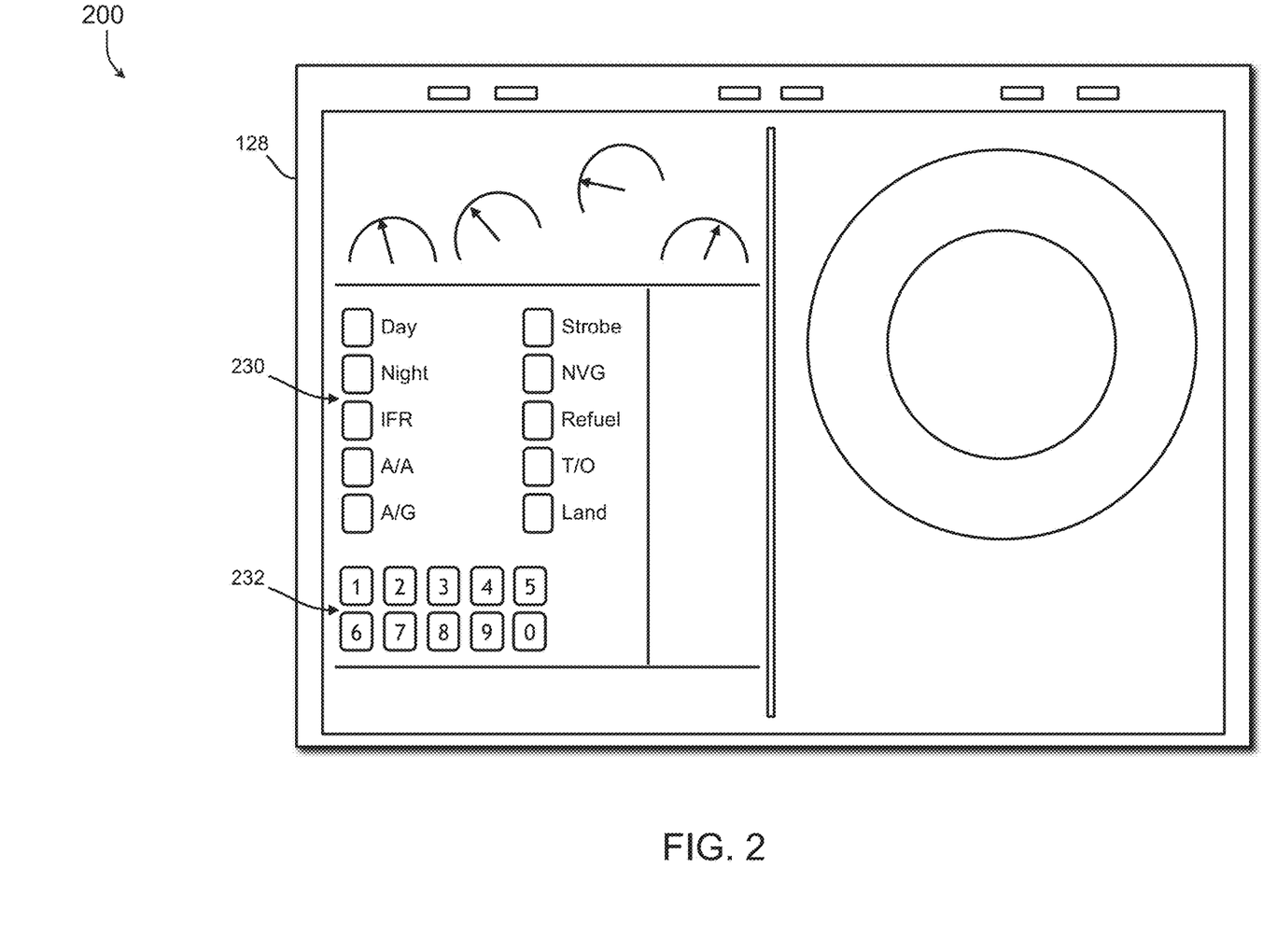
FIG. 2 is a diagram of an exemplary Multi-Function Display (MFD) overview as a pilot interface in accordance with an embodiment of the inventive concepts disclosed herein.

FIG. 2 MFD

Referring now to FIG. 2, a diagram of an exemplary Multi-Function Display (MFD) overview as a pilot interface in accordance with an embodiment of the inventive concepts disclosed herein is shown. A flight deck MFD diagram 200 may indicate one option for a pilot entering the pilot ID via a numeric touch screen keypad pilot interface 232 displayed on the MFD 128. In addition, the pilot may recall a specific pilot preference using a pilot preference selection 230 to select a desired aircraft system configuration.

Here, an exemplary pilot preference may include a mission specific preference including a day aircraft system configuration, a night aircraft system configuration, an IFR aircraft system configuration, an A/A aircraft system configuration, and an A/G aircraft system configuration. In addition, an exemplary pilot preference may include a phase of flight specific preference including a strobe aircraft system configuration, an NVG aircraft system configuration, an aerial refueling aircraft system configuration, and a takeoff and landing aircraft system configuration.

Figure 3:
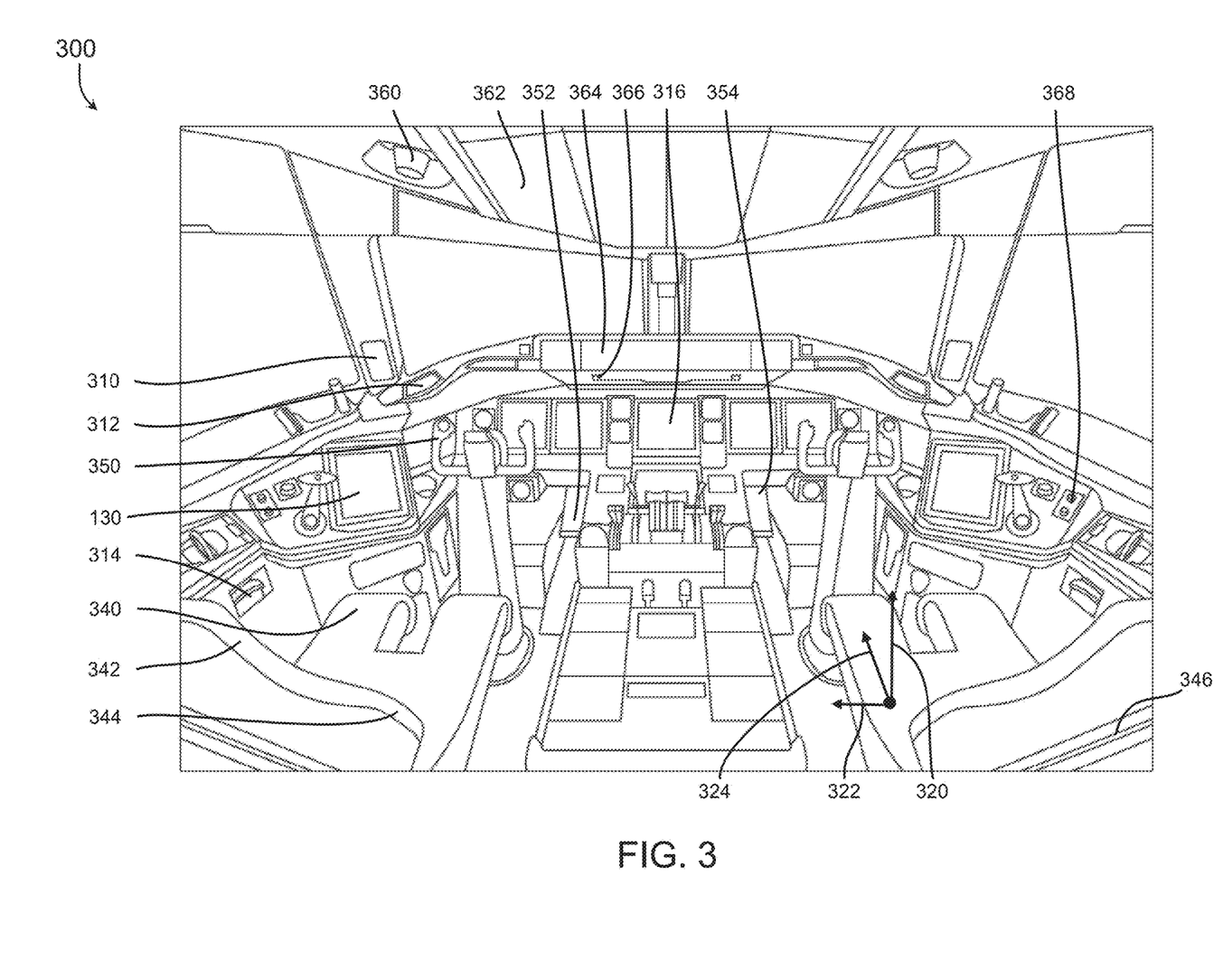
FIG. 3 is a diagram of a transport category flight deck exemplary of an embodiment of the inventive concepts disclosed herein.

FIG. 3 Flight Deck

Referring now to FIG. 3, a diagram of a transport category flight deck exemplary of an embodiment of the inventive concepts disclosed herein is shown. A transport category flight deck 300 may include a plurality of aircraft systems controls available to the controller 110 for auto configuration via the system for retention of flight deck preferences 100.

In one embodiment of the inventive concepts disclosed herein, the transport flight deck 300 may include an RFID reader 310 configured to excite an RFID element carried by the pilot. As the pilot boards the aircraft, the pilot may proximally place the RFID element near the RFID reader to provide the controller 110 with the pilot ID. A bio scanner 312 may function to receive an input from a physical aspect of the pilot and provide the pilot ID to the controller 110.

Similarly, a magnetic card reader 314 may receive a magnetic card (e.g., crew ID card) and provide the pilot ID to the controller 110. As above, the pilot may input a series of characters to the transport MFD 316 which in turn may supply the pilot ID to the controller 110.

For reference, each axis of aircraft may be helpful in describing actions of some of the aircraft system configurations used herein. A vertical axis 320 may be substantially parallel with a lift vector of the aircraft. A lateral axis 322 may be substantially parallel with a wing line from wing tip to wing tip of the aircraft. A longitudinal axis 324 may be substantially parallel with a fuselage of the aircraft.

In one embodiment of the inventive concepts disclosed herein, the system for retention of flight deck preferences 100 may function to manipulate the flight deck seat 340. Here, a traditional flight deck seat 340 may manually and electrically translate in each of the vertical 320, lateral 322 and longitudinal 234 axes of the aircraft. In embodiments, the controller 110 may command the DCU 116 to control a 3 axis position of the flight deck seat 340 to the pilot preference desired position. Contemplated herein, one pilot preference may include an entry/exit position, a fly position, a takeoff position, a landing position, and a cruise position. Each pilot preference may be selectable via pilot input.

Further, the system for retention of flight deck preferences 100 may function to manipulate the seat back 342 at a pilot preference angle and a vertical 320 and longitudinal 324 position relative to a horizontal seat base. As with the seat, a pilot preference may include a plurality of positions based on the mission and phase of flight. Similarly, a seat lumbar 344 may be commanded by the controller 110 to a pilot preference size shape and position. Also, a seat armrest 346 may be commanded based on one pilot preference.

In one embodiment of the inventive concepts disclosed herein, the system for retention of flight deck preferences 100 may function to manipulate a position of a flight control yoke 350. Some aircraft may retain an ability for the pilot to alter a position of the flight control yoke 350 in one or more axes. Similarly, the system for retention of flight deck preferences 100 may command manipulation of a set of rudder pedals 352 in the longitudinal 324 and possible vertical 320 axes. As a set of brake pedals 354 may traditionally couple with the rudder pedals 352, the system for retention of flight deck preferences 100 may command a positioning of the brake pedals 354 relative to the rudder pedals 352 based on the pilot preference.

In one embodiment of the inventive concepts disclosed herein, the system for retention of flight deck preferences 100 may command a pilot preference setting of each internal light within the transport flight deck 300 including an overhead light 360, lights within an overhead panel lighting 362, a forward glareshield panel 364, and a set of glareshield lighting 366. As a flight deck lights control 368 may command the DCU 116 to manipulate each light within the transport flight deck 300, the controller 110 may function to command the DCU 116 to comply with the pilot preference.

Figure 4:
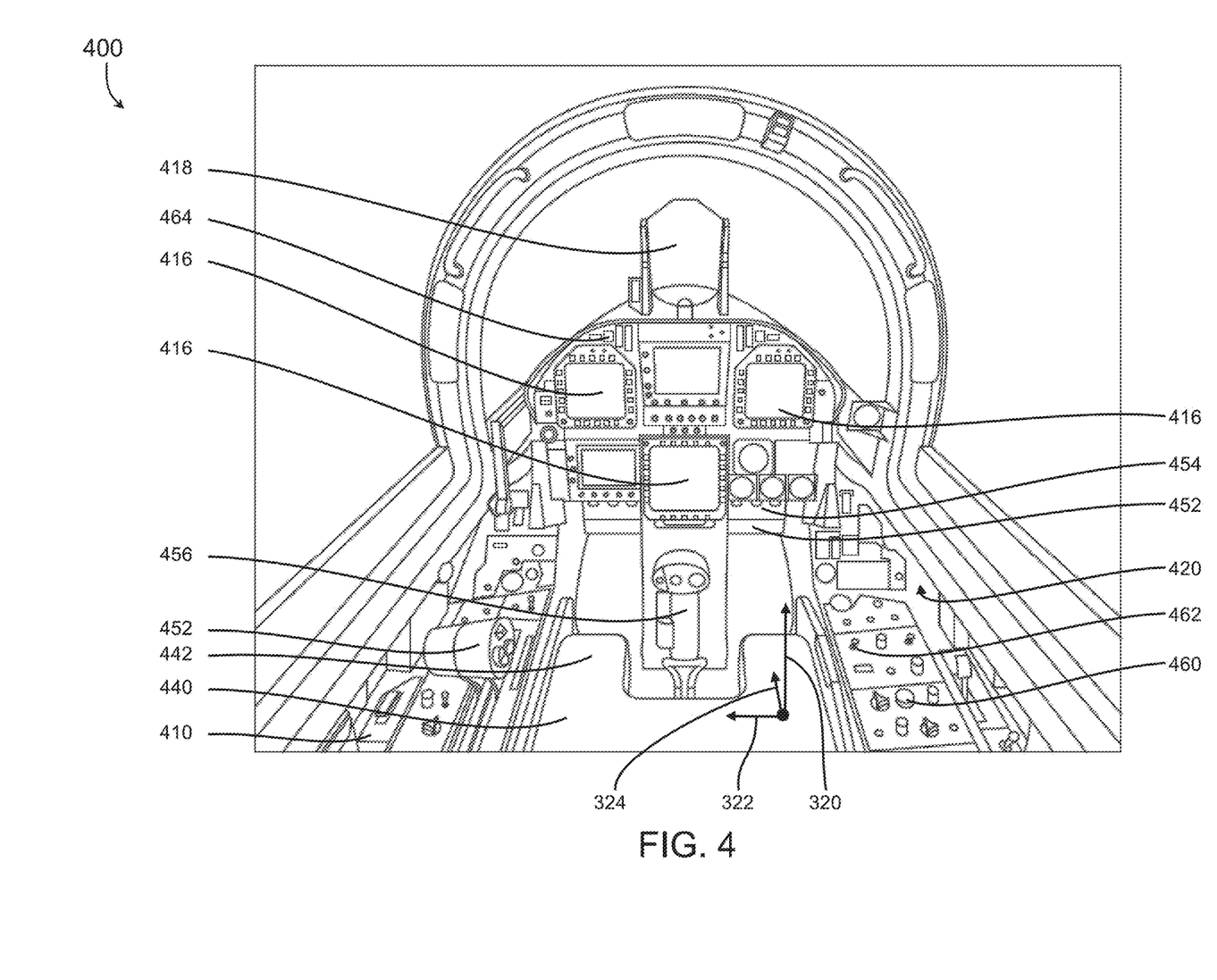
FIG. 4 is a diagram of a fighter cockpit exemplary of one embodiment of the inventive concepts disclosed herein.

FIG. 4 Fighter Cockpit

Referring now to FIG. 4, a diagram of a fighter cockpit exemplary of one embodiment of the inventive concepts disclosed herein is shown. A fighter cockpit 400 may be particularly suited for application of the system for retention of flight deck preferences 100.

As security of information may play a higher role than in the previous example of the flight deck 300, the fighter cockpit may still benefit from an auto configuration of a plurality of aircraft systems controlled by the controller 110. One example of receiving the pilot ID may include a similar pilot entry to a fighter MFD 416. As above, a pilot may enter a code or number on the fighter MFD 416 to send the pilot ID to the controller 110.

Another exemplary method of supplying the system for retention of flight deck preferences 100 with a pilot ID and a pilot preference may include a DTC loader 410 capable of physically receiving a data cartridge and connecting with an onboard data system capable of supplying the pilot ID to the controller 110.

Internally, the system for retention of flight deck preferences 100 may function to configure a plurality of aircraft systems internal to the fighter cockpit 400. The controller 110 may send a brightness and data signal to a head up display (HUD) 418 to manipulate a brightness and content according to the pilot preference. For example, the pilot preference may cause the controller 110 to command a day brightness setting, a night setting, a mission related setting, and a NVIS setting for use with the NVG. Similarly, the controller may command a set of internal flood lights 420 in a similar manner with settings based on ambient light and mission requirements.

Physically, the system for retention of flight deck preferences 100 may command a position of an ejection seat 440 and an ejection seat leg extension 442 according to one pilot preference. For example, one pilot preference may position the ejection seat 440 vertically 320 as well as longitudinally 324. A pilot preference may also select a length of the seat leg extension 442 longitudinally 324 (e.g., fore and aft) for proper fit of the pilot. the system for retention of flight deck preferences 100 may also configure a position of a flight control stick 450 whether centrally located as shown as well as a side stick in some models of aircraft.

Similar to those in the transport flight deck 300, a set of fighter rudder pedals 452 as well as a set of fighter brake pedals 454 may be commanded vertically 320 and longitudinally 324. In some aircraft so equipped, a throttle 456 may be positioned based on the pilot preference to be more easily accessible to the pilot.

The controller 110 may function in parallel with a setting of an interior lights control 460, exterior lights control 462, and warning/caution lights 464 in control of cockpit illumination as well as color.

Specific to the fighter cockpit 400, the pilot preference commanding exterior lights may be specifically configured for specific missions. Strobe color and frequency may operate to identify the fighter aircraft to friendly forces. Here, a pilot preference may include the strobe color as a day (white) or NVG friendly IR setting with a strobe frequency related to a flight position (e.g., leader, number 2, number 3, etc.) of the fighter aircraft.

Figure 5:
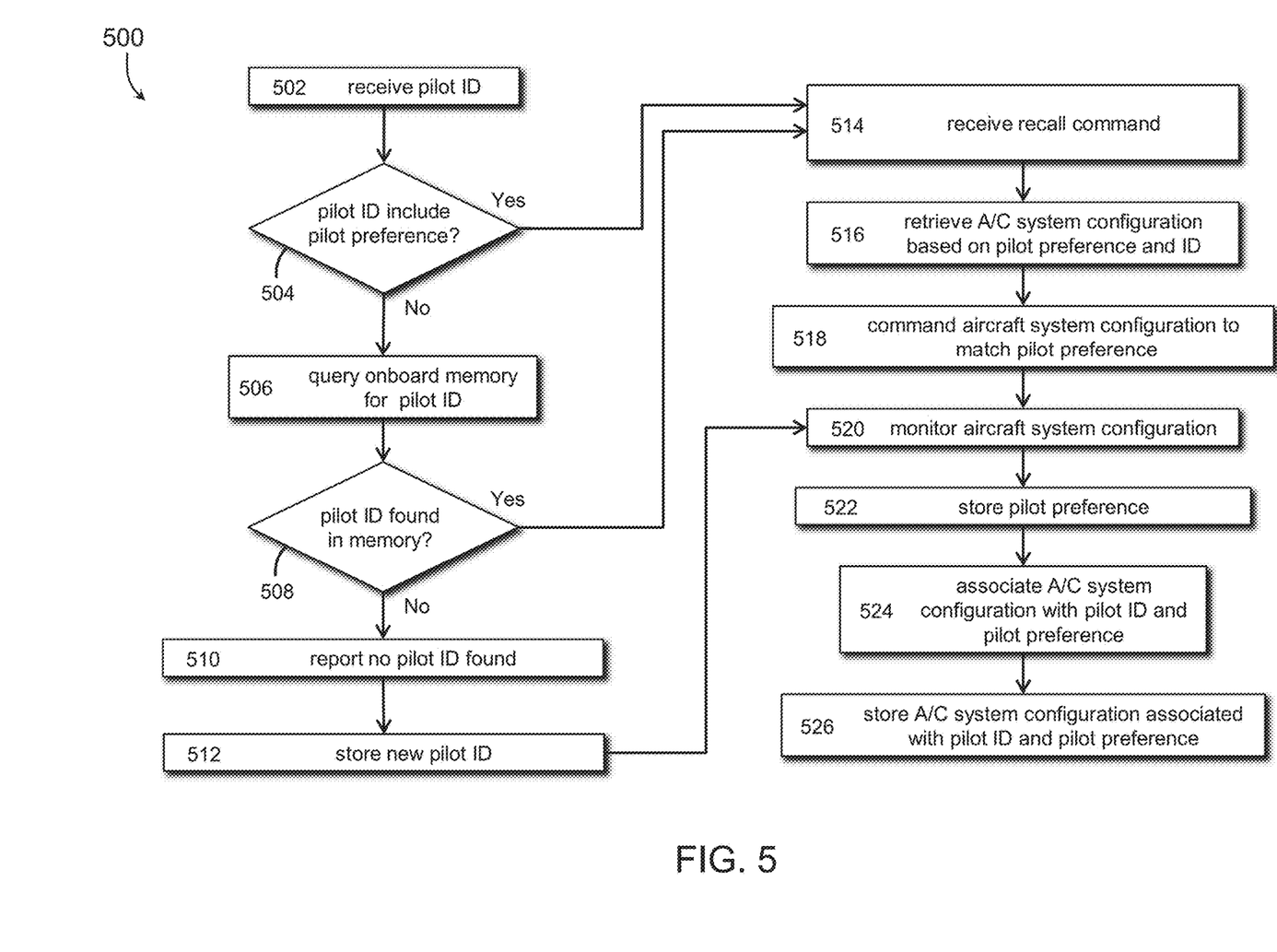
FIG. 5 is a diagram of an exemplary logic flow in accordance with one embodiment of the inventive concepts disclosed herein.

FIG. 5 Logic

Referring now to FIG. 5, a diagram of an exemplary logic flow in accordance with one embodiment of the inventive concepts disclosed herein is shown. A logic flow 500 may provide one sequence of events leading to a successful application of the system for retention of flight deck preferences 100. One logic flow may include at a step 502, receive pilot ID from the pilot interface 112, the pilot ID associated with a pilot and save the pilot ID to the memory 114. A query may ask if a pilot preference is included with the pilot ID at a step 504. Should the result be negative the logic may pass to a step 506 to query the onboard memory for the pilot ID and a step 508 may determine if the pilot ID was found within the onboard memory. If the result is negative, the logic may pass to report no ID at a step 510 and store the new ID at a step 512 within the onboard memory.

Should a result of either query 504 or query 508 be positive, the logic may pass to a step 514 to receive a recall command from the pilot, the recall command including a pilot preference associated with one aircraft system configuration and the pilot ID. The recall command may include an auto recall command based on the pilot ID, a recall command sent by the pilot, and a recall command based on a local time of day. A step 516 may retrieve the aircraft system configuration associated with the pilot preference from the memory based on the recall command while a step 518 may command the aircraft system configuration of each of the plurality of aircraft systems, via the DCU 116, based on the retrieved aircraft system configuration associated with the pilot preference.

From a step 512 to store the new pilot ID as well as from the step 518, the logic may continue to monitor each aircraft system configurations 520 to await a save command from the pilot. Once commanded, the logic may continue to store pilot preference at a step 522, associate the pilot ID, the pilot preference, and the aircraft systems configuration at a step 524 and store the associated pilot ID, pilot preference, and aircraft system configuration in memory at a step 526.

Figure 6:
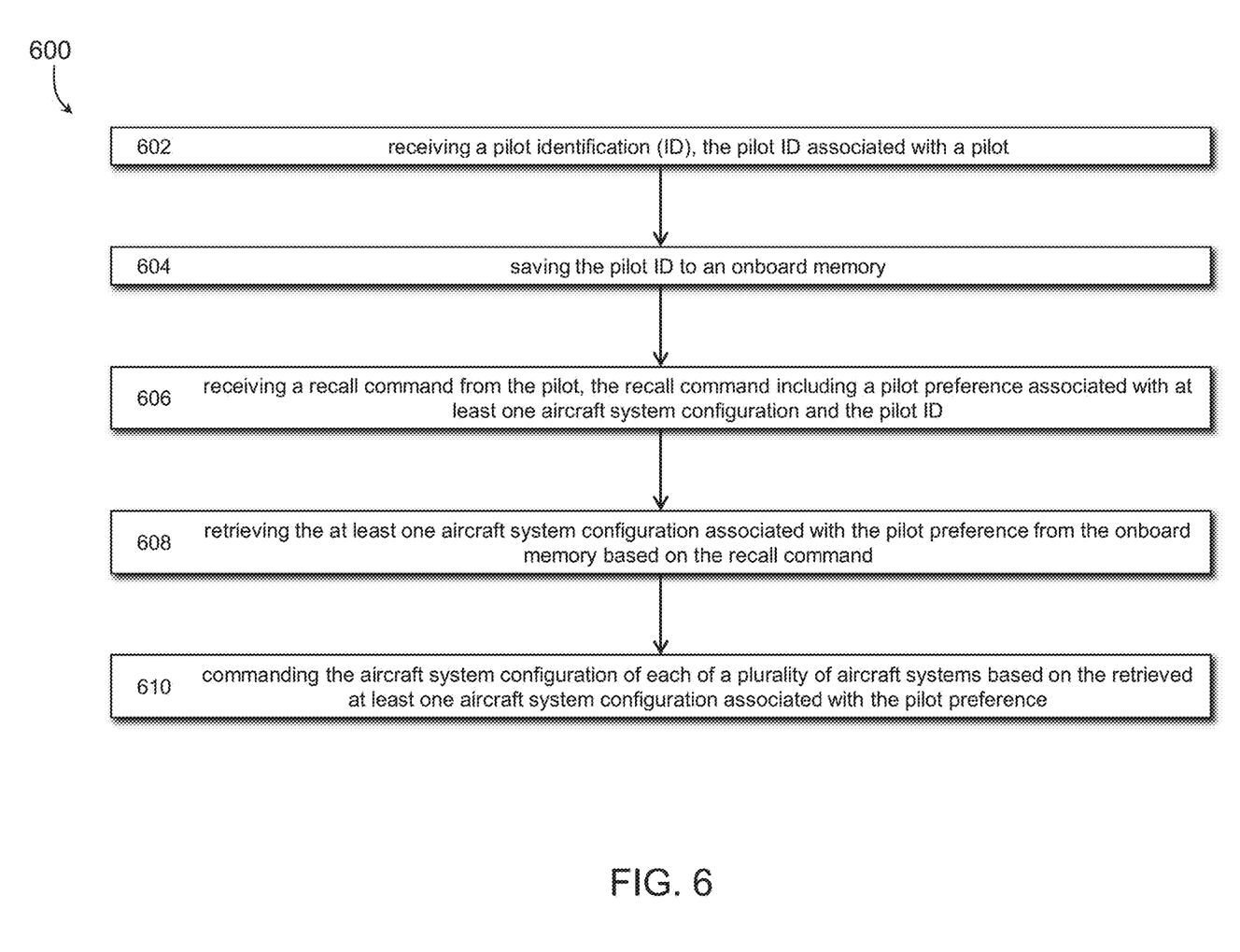
FIG. 6 is a diagram of an exemplary method flow in accordance with one embodiment of the inventive concepts disclosed herein.

FIG. 6 Method

Referring now to FIG. 6, a diagram of an exemplary method flow in accordance with one embodiment of the inventive concepts disclosed herein is shown. A method flow 600 may include at a step 602, receiving a pilot identification (ID), the pilot ID associated with a pilot and, at a step 604, saving the pilot ID to an onboard memory. A step 606 may include receiving a recall command from the pilot, the recall command including a pilot preference associated with at least one aircraft system configuration and the pilot ID while a step 608 may include retrieving the at least one aircraft system configuration associated with the pilot preference from the onboard memory based on the recall command. A step 610 may include commanding the aircraft system configuration of each of a plurality of aircraft systems based on the retrieved at least one aircraft system configuration associated with the pilot preference.

The aircraft system configurations applicable to each of an aircraft flight deck seat position, an aircraft flight deck rudder pedal position, an aircraft flight deck interior lighting illumination level, an aircraft flight deck interior lighting color, an aircraft flight deck display windows configuration, an aircraft flight deck display illumination level, an aircraft flight deck display symbology, an aircraft exterior light illumination level, an aircraft exterior strobe light frequency, and an aircraft exterior strobe light color.

Conclusion

As will be appreciated from the above description, embodiments of the inventive concepts disclosed herein may provide a novel solution to retention of specific and comprehensive pilot preferences for each aircraft system for each aircraft flown by each pilot.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for retention of flight deck preferences, comprising:
   a pilot interface within a flight deck of an aircraft;
   a Data Concentrating Unit (DCU) onboard the aircraft, the DCU configured for receiving a digital input and sending a control signal to at least one aircraft system in compliance with the digital input;
   a controller operatively coupled with the DCU;
   a plurality of aircraft systems each having an aircraft system configuration;
   a tangible, non-transitory memory configured to communicate with the controller, the tangible, non-transitory memory having instructions stored therein that, in response to execution by the controller, cause the controller to:

receive a pilot identification (ID) from the pilot interface, the pilot ID associated with a pilot;
save the pilot ID to the memory;
receive a recall command from the pilot, the recall command including a pilot preference associated with at least one of the aircraft system configuration and the pilot ID;
retrieve the at least one aircraft system configuration associated with the pilot preference from the memory based on the recall command; and
command the aircraft system configuration of each of the plurality of aircraft systems, via the DCU, based on the retrieved at least one aircraft system configuration associated with the pilot preference;
wherein the aircraft system configuration applies the pilot preference to each of:
an aircraft flight deck seat position,
an aircraft flight deck seat shape,
an aircraft flight deck rudder pedal position based on at least one of a longitudinal position of the rudder pedal, a vertical position of the rudder pedal, and a lateral angle of the rudder pedal;
an aircraft flight deck brake pedal positioned atop the rudder pedal,
an aircraft flight deck interior lighting illumination level,
an aircraft flight deck interior lighting color,
an aircraft flight deck display windows configuration,
an aircraft flight deck display illumination level,
an aircraft flight deck display symbology,
an aircraft exterior light illumination level,
an aircraft exterior strobe light frequency, and
an aircraft exterior strobe light color.

2. The system for retention of flight deck preferences of claim 1, wherein the pilot interface further comprises at least one of a data link, a Radio Frequency Identification (RFID) reader, a Data Transfer Cartridge (DTC), a magnetic card reader, a touch screen display, a personal digital assistant (PDA), and a biometric scanner.

3. The system for retention of flight deck preferences of claim 2, wherein each of the data link, the DTC, and the PDA include each of the pilot preference and the aircraft system configuration.

4. The system for retention of flight deck preferences of claim 1, wherein the aircraft flight deck seat position further comprises a vertical position, a lateral position, and a longitudinal position.

5. The system for retention of flight deck preferences of claim 1, wherein the aircraft flight deck display symbology further comprises an Multi-Function Display (MFD) symbology, a Heads Up Display (HUD) symbology, and a Helmet Mounted Device (HMD) symbology.

6. The system for retention of flight deck preferences of claim 1, wherein the aircraft flight deck interior lighting illumination level further comprises an illumination level of at least one of flood lights, backlights, thunderstorm lights, and glareshield lights.

7. The system for retention of flight deck preferences of claim 1, wherein the pilot preference further comprises one of a day preference, a night preference, a mission specific preference, a Visual Flight Rules (VFR) preference and an Instrument Flight Rules (IFR) preference.

8. The system for retention of flight deck preferences of claim 1, wherein the recall command further comprises one of an auto recall command based on the pilot ID, a recall command sent by the pilot, and a recall command based on a local time of day.

9. The system for retention of flight deck preferences of claim 1, wherein the aircraft system configuration further applies to at least one of a declutter level of the aircraft flight deck display symbology, a symbology type, and an aircraft flight deck flight control position.

10. The system for retention of flight deck preferences of claim 1, wherein the aircraft flight deck seat shape further comprises a lumbar support height, a lumbar support shape, an armrest position, a headrest position, a leg extension position, a seat back recline angle, and a seat angle.

11. A method for retention of flight deck preferences, comprising:
receiving a pilot identification (ID), the pilot ID associated with a pilot;
saving the pilot ID to an onboard memory;
receiving a recall command from the pilot, the recall command including a pilot preference associated with at least one aircraft system configuration and the pilot ID;
retrieving the at least one aircraft system configuration associated with the pilot preference from the onboard memory based on the recall command; and
commanding the aircraft system configuration of each of a plurality of aircraft systems based on the retrieved at least one aircraft system configuration associated with the pilot preference;
wherein the aircraft system configuration applies the pilot preference to each of:
an aircraft flight deck seat position,
an aircraft flight deck rudder pedal position based on at least one of a longitudinal position of the rudder pedal, a vertical position of the rudder pedal, and a lateral angle of the rudder pedal,
an aircraft flight deck brake pedal positioned atop the rudder pedal,
an aircraft flight deck interior lighting illumination level,
an aircraft flight deck interior lighting color,
an aircraft flight deck display windows configuration,
an aircraft flight deck display illumination level,
an aircraft flight deck display symbology,
an aircraft exterior light illumination level,
an aircraft exterior strobe light frequency, and
an aircraft exterior strobe light color.

12. The method for retention of flight deck preferences of claim 11, wherein receiving the pilot ID further comprises receiving the pilot preference and the at least one aircraft system configuration.

13. The method for retention of flight deck preferences of claim 11, wherein the pilot preference further comprises one of a day preference, a night preference, a mission specific preference, a Visual Flight Rules (VFR) preference and an Instrument Flight Rules (IFR) preference.

14. The method for retention of flight deck preferences of claim 11, wherein commanding the aircraft system configuration further comprises commanding a digital control unit (DCU) to comply with the pilot preference.

15. The method for retention of flight deck preferences of claim 11, wherein the aircraft flight deck display symbology further comprises an Multi-Function Display (MFD) symbology, a Heads Up Display (HUD) symbology, and a Helmut Mounted Device (HMD) symbology.

* * * * *